United States Patent
Tagawa et al.

(10) Patent No.: US 9,640,325 B2
(45) Date of Patent: May 2, 2017

(54) METHOD FOR MANUFACTURING SOLID ELECTROLYTIC CAPACITOR

(71) Applicant: SHOWA DENKO K.K., Minato-ku, Tokyo (JP)

(72) Inventors: Yasuyuki Tagawa, Tokyo (JP); Naoki Murata, Tokyo (JP); Motoaki Araki, Tokyo (JP); Takashi Ohkubo, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 14/781,237

(22) PCT Filed: Apr. 4, 2014

(86) PCT No.: PCT/JP2014/060023
§ 371 (c)(1),
(2) Date: Sep. 29, 2015

(87) PCT Pub. No.: WO2014/163202
PCT Pub. Date: Oct. 9, 2014

(65) Prior Publication Data
US 2016/0055981 A1    Feb. 25, 2016

(30) Foreign Application Priority Data
Apr. 5, 2013 (JP) ................. 2013-079812

(51) Int. Cl.
H01G 9/00      (2006.01)
H01G 9/028    (2006.01)
H01G 9/048    (2006.01)
H01G 9/15      (2006.01)

(52) U.S. Cl.
CPC ............ *H01G 9/0036* (2013.01); *H01G 9/028* (2013.01); *H01G 9/048* (2013.01); *H01G 9/15* (2013.01)

(58) Field of Classification Search
CPC .................................................. H01G 9/0036
See application file for complete search history.

(56) References Cited

U.S. PATENT DOCUMENTS

| | | | |
|---|---|---|---|
| 2010/0165546 | A1 | 7/2010 | Yoshida et al. |
| 2011/0049433 | A1 | 3/2011 | Jonas et al. |
| 2012/0229955 | A1 | 9/2012 | Biler |
| 2013/0037411 | A1 | 2/2013 | Atobe et al. |

FOREIGN PATENT DOCUMENTS

| | | |
|---|---|---|
| JP | 2000-232036 A | 8/2000 |
| JP | 2003-100561 A | 4/2003 |
| JP | 2004-241132 A | 8/2004 |
| JP | 2005-109252 A | 4/2005 |
| JP | 2009-170319 A | 7/2009 |
| JP | 2011-510141 A | 3/2011 |
| JP | 2012-191197 A | 10/2012 |
| KR | 1020080095907 A | 10/2008 |
| WO | 2011/108254 A1 | 9/2011 |

OTHER PUBLICATIONS

International Search Report for PCT/JP2014/060023 dated Jul. 1, 2014.

*Primary Examiner* — Seahvosh Nikmanesh
(74) *Attorney, Agent, or Firm* — Sughrue Mion, PLLC

(57) ABSTRACT

A method for manufacturing a solid electrolytic capacitor, which includes the steps of: in a dispersion medium containing a monomer for obtaining a conjugated conductive polymer and a seed particle with protective colloid formed of a polyanion, polymerizing the monomer to obtain a conjugated conductive polymer-containing dispersion liquid; attaching the conjugated conductive polymer-containing dispersion liquid to the surface of a porous anode body at least having an anode body made of a valve metal and a dielectric film formed on the surface of the anode body; and removing a part or all of the dispersion medium from the conjugated conductive polymer-containing dispersion liquid attached to the porous anode body to form a solid electrolyte layer. Also disclosed is a solid electrolytic capacitor obtained by the method.

12 Claims, No Drawings

METHOD FOR MANUFACTURING SOLID ELECTROLYTIC CAPACITOR

CROSS REFERENCE TO RELATED APPLICATIONS

This application is a National Stage of International Application No. PCT/JP2014/060023 filed Apr. 4, 2014, claiming priority based on Japanese Patent Application No. 2013-079812 filed Apr. 5, 2013, the contents of all of which are incorporated herein by reference in their entirety.

TECHNICAL FIELD

The present invention relates to a method for manufacturing a solid electrolytic capacitor and a solid electrolytic capacitor obtained by this method.

BACKGROUND ART

The solid electrolytic capacitor is known to be manufactured by forming a dielectric oxide film on a metal surface through anodic oxidation and bringing this film into contact with a solid electrolyte. The solid electrolytic capacitor for which a conductive polymer is used as the solid electrolyte has been proposed.

As examples of the metal covered with a dielectric oxide film through anodic oxidation, aluminum, tantalum, niobium, etc. are known.

As conductive polymers used for a solid electrolytic capacitor, conjugated conductive polymers such as polythiophene, polypyrrole, polyaniline, polyacetylene, polyphenylene, poly(p-phenylenevinylene), polyacene, polythiophenevinylene, and derivatives thereof are known. The technology to dope these conjugated conductive polymers with a poly anion such as polystyrene sulfonate as a counter anion is known.

Generally, a solid electrolyte is formed by chemically oxidizing and polymerizing or electropolymerizing a monomer solution for obtaining a conductive polymer and an oxidant solution on the dielectric oxide film formed on the surface of metal exhibiting valve action. In addition, another method of forming a solid electrolyte by applying a conductive polymer solution or suspension liquid to a metal surface has been proposed.

For example, Patent Document 1 discloses the manufacturing method including the steps of; forming a first solid electrolyte layer by impregnating a capacitor element with a conductive polymer dispersion solution in which conductive polymer particles are dispersed; and forming a second solid electrolyte layer by impregnating the surface of this first solid electrolyte layer with a solution containing a heterocyclic monomer and then a solution containing an oxidant or with a mixed solution containing a heterocyclic monomer and an oxidant.

Furthermore, Patent Document 2 discloses the manufacturing method including the steps of: forming a conductive polymer layer as a solid electrolyte layer on a capacitor element in which a dielectric oxide film is formed on the surface of a sintered body formed by sintering valve metal powders, by chemically polymerizing a polymerizable monomer; immersing this capacitor element in a conductive polymer solution or applying a conductive polymer solution to this capacitor element; drying this capacitor element; and forming another conductive polymer layer on the conductive polymer layer formed by the chemical polymerization.

Still furthermore, Patent Document 3 proposes the process to prepare a poly(3,4-ethylenedioxythiophene)-polystyrenesulfonate (commonly known as PEDOT-PSS) dispersion liquid with a lower viscosity to impregnate a capacitor with a conductive polymer by polymerization under ultrasonic irradiation.

CITATION LIST

Patent Literature

Patent Document 1: JP 2003-100561 A
Patent Document 2: JP 2005-109252 A
Patent Document 3: JP 2011-510141 A

SUMMARY OF INVENTION

Technical Problem

The miniaturization and generalization of recent electronic devices have required electrolytic capacitors with a small size and an improved high-frequency performance. Furthermore, solid electrolytic capacitors exhibiting impedance characteristics in a high frequency region have been required more than ever before.

By the way, conductive polymers easily agglomerate in dispersion media. This may increase the viscosity of dispersion liquid containing conductive polymers during the reaction. The industrial handling of dispersion liquid with a high viscosity is inconvenient. Furthermore, conductive polymer-containing dispersion liquid with higher conductivity, impregnation properties, and application properties has been required for application to solid electrolytic capacitors.

An objective of the present invention is to provide a method for manufacturing a solid electrolytic capacitor, which can productively manufacture a solid electrolytic capacitor with excellent capacitor characteristics by using a conjugated conductive polymer with suppressed the increase in the viscosity during the polymerization, excellent conductivity, high impregnation properties, and high application properties and also to provide a solid electrolytic capacitor with excellent capacitor characteristics obtained by this method.

Solution to Problem

As the result of their extensive studies, the inventors have found that manufacturing a solid electrolytic capacitor by using a conjugated conductive polymer-containing dispersion liquid containing a seed particle with protective colloid formed of a polyanion can solve the above-mentioned problems.

The present invention relates to the following 1 to 13.

1. A method for manufacturing a solid electrolytic capacitor, including the steps of:

in a dispersion medium containing a monomer for obtaining a conjugated conductive polymer and a seed particle with protective colloid formed of a polyanion, polymerizing the monomer to obtain a conjugated conductive polymer-containing dispersion liquid;

attaching the conjugated conductive polymer-containing dispersion liquid to the surface of a porous anode body at least having an anode body made of a valve metal and a dielectric film formed on the surface of the anode body; and removing a part or all of the dispersion medium from the conjugated conductive polymer-containing dispersion liquid attached to the porous anode body to form a solid electrolyte layer.

2. The method according to the above-mentioned 1, in which the seed particle is a homopolymer or a copolymer obtained by polymerizing an ethylenically unsaturated monomer.

3. The method according to the above-mentioned 1 or 2, in which the particle size D50 of the seed particle with protective colloid formed of a polyanion is from 0.01 to 10 μm.

4. The method according to any one of the above-mentioned 1 to 3, in which in the step to obtain the conjugated conductive polymer-containing dispersion liquid, an additional dispersion liquid containing a seed particle with protective colloid formed of a polyanion is added during the polymerization of the monomer.

5. The method according to any one of the above-mentioned 1 to 4, in which in the step to obtain the conjugated conductive polymer-containing dispersion liquid, the generated conjugated conductive polymer is subjected to dispersion treatment during the polymerization of the monomer.

6. The method according to the above-mentioned 5, in which the dispersion treatment is conducted under ultrasonic irradiation.

7. The method according to any one of the above-mentioned 1 to 6, in which the monomer for obtaining a conjugated conductive polymer is at least one selected from a pyrrole containing or not containing a substituent, an aniline containing or not containing a substituent, and a thiophene containing or not containing a substituent.

8. The method according to any one of the above-mentioned 1 to 6, in which the monomer for obtaining a conjugated conductive polymer contains a compound expressed by the following formula (I).

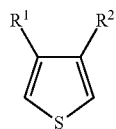

(I)

In the formula (I), $R^1$ and $R^2$ each independently represent a hydrogen atom, a hydroxyl group, an alkyl group with 1 to 18 carbon atoms containing or not containing a substituent, an alkoxy group with 1 to 18 carbon atoms containing or not containing a substituent, or an alkylthio group with 1 to 18 carbon atoms containing or not containing a substituent, or may bind to each other to form a ring such as an alicycle with 3 to 10 carbon atoms containing or not containing a substituent, an aromatic ring with 6 to 10 carbon atoms containing or not containing a substituent, an oxygen atom-containing hetero ring with 2 to 10 carbon atoms containing or not containing a substituent, a sulfur atom-containing hetero ring with 2 to 10 carbon atoms containing or not containing a substituent, or an oxygen and sulfur atom-containing hetero ring with 2 to 10 carbon atoms containing or not containing a substituent.

9. The method according to any one of the above-mentioned 1 to 8, in which the polyanion is a polymer with a sulfonate group.

10. The method according to any one of the above-mentioned 1 to 9, in which the anion group of the polyanion is from 0.25 to 30 mol based on 1 mol of the monomer for obtaining a conjugated conductive polymer.

11. The method according to any one of the above-mentioned 1 to 10, in which in the step to obtain the conjugated conductive polymer-containing dispersion liquid, the dispersion medium contains water, and the polymerization is conducted by using at least one oxidant selected from a peroxodisulfuric acid and salts thereof.

12. The method according to any one of the above-mentioned 1 to 11, in which the conjugated conductive polymer-containing dispersion liquid contains at least one electric conductivity improver selected from ethylene glycol, propylene glycol, and glycerin.

13. A solid electrolytic capacitor obtained by the method according to any one of the above-mentioned 1 to 12.

Advantageous Effects of Invention

The method of the present invention can synthesize a conjugated conductive polymer-containing dispersion liquid containing a seed particle with protective colloid exhibiting excellent conjugated conductivity, excellent impregnation properties and excellent application properties to a porous anode body on which a dielectric oxide film is formed, without increasing the viscosity of the dispersion liquid during the polymerization, to productively manufacturing a solid electrolytic capacitor with excellent capacitor characteristics.

DESCRIPTION OF EMBODIMENTS

The method for manufacturing a solid electrolytic capacitor according to the present invention includes the steps of:
in a dispersion medium containing a monomer for obtaining a conjugated conductive polymer and a seed particle with protective colloid formed of a polyanion, polymerizing the monomer to obtain a conjugated conductive polymer-containing dispersion liquid;
attaching the conjugated conductive polymer-containing dispersion liquid to the surface of a porous anode body at least having an anode body made of a valve metal and a dielectric film formed on the surface of the anode body; and
removing a part or all of the dispersion medium from the conjugated conductive polymer-containing dispersion liquid attached to the porous anode body to form a solid electrolyte layer.

Step to Obtain Conjugated Conductive Polymer-Containing Dispersion Liquid

In this step, in a dispersion medium containing a monomer for obtaining a conjugated conductive polymer and a seed particle with protective colloid formed of a polyanion, the monomer is polymerized to obtain a conjugated conductive polymer-containing dispersion liquid.

The conjugated conductive polymer-containing dispersion liquid in the present invention is a dispersion liquid (conductive polymer-containing dispersion liquid) in which particles (hereinafter referred to as "conductive polymer-containing particles") containing a seed particle with protective colloid formed of a polyanion and a conjugated conductive polymer (hereinafter sometimes merely referred to as "conductive polymer") are dispersed in a dispersion medium.

In the conjugated conductive polymer-containing particles, a polyanion is coordinated to form protective colloid on the surface of the seed particle. This causes the conjugated conductive polymer to be doped with the polyanion.

Coordinating a polyanion as a dopant on the seed particle can suppress the thickening during the polymerization. In addition, the polyanion coordinated on the surface of the seed particle can be recoordinated to the conjugated conductive polymer to provide the conjugated conductive polymer with sufficient conductivity.

Conjugated Conductive Polymer

The conjugated conductive polymer is not limited in particular as long as being an organic polymer with a π conjugated system in the main chain. Examples of the conjugated conductive polymer include polypyrroles, polythiophenes, polyacetylenes, polyphenylenes, polyphenylenevinylenes, polyanilines, polyacenes, polythiophenevinylenes, and the copolymers of thereof. Among these, polypyrroles, polythiophenes, and polyanilines are preferable, and polythiophenes are more preferable. The conjugated conductive polymer preferably has a substituent such as an alkyl group, a carboxyl group, a sulfonic acid group, an alkoxyl group, a hydroxyl group, and a cyano group because obtaining high conductivity.

Specific examples of the preferable conjugated conductive polymers include polypyrroles such as polypyrrole, poly(N-methylpyrrole), poly(3-methylpyrrole), poly(3-ethylpyrrole), poly(3-n-propylpyrrole), poly(3-butylpyrrole), poly(3-octylpyrrole), poly(3-decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3-methyl-4-carboxybutylpyrrole), poly(3-hydroxypyrrole), poly(3-methoxypyrrole), poly(3-ethoxypyrrole), poly(3-butoxypyrrole), poly(3-hexyloxypyrrole), and poly(3-methyl-4-hexyloxypyrrole).

Specific examples of the preferable conjugated conductive polymer also include polythiophenes such as polythiophene, poly(3-methylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3-chlorothiophene), poly(3-iodothiophene), poly(3-cyanothiophene), poly(3-phenylthiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-heptyloxythiophene), poly(3-octyloxythiophene), poly(3-decyloxythiophene), poly(3-dodecyloxythiophene), poly(3-octadecyloxythiophene), poly(3,4-dihydroxythiophene), poly(3,4-dimethoxythiophene), poly(3,4-diethoxythiophene), poly(3,4-dipropoxythiophene), poly(3,4-dibutoxythiophene), poly(3,4-dihexyloxythiophene), poly(3,4-diheptyloxythiophene), poly(3,4-dioctyloxythiophene), poly(3,4-didecyloxythiophene), poly(3,4-didodecyloxythiophene), poly(3,4-ethylenedioxythiophene), poly(3,4-propylenedioxythiophene), poly(3,4-butylenedioxythiophene), poly(3-methyl-4-methoxythiophene), poly(3-methyl-4-ethoxythiophene), poly(3-carboxythiophene), poly(3-methyl-4-carboxythiophene), poly(3-methyl-4-carboxyethylthiophene), poly(3-methyl-4-carboxybutylthiophene), and poly(3,4-ethyleneoxythiathiophene).

Specific examples of the preferable conjugated conductive polymer also include polyanilines such as polyaniline, poly(2-methylaniline), poly(3-isobutylaniline), poly(2-anilinesulfonic acid), and poly(3-anilinesulfonic acid).

Among these, polypyrrole, polythiophene, poly(N-methylpyrrole), poly(3-methylthiophene), poly(3-methoxythiophene), and poly(3,4-ethylenedioxythiophene) are preferable because obtaining high conductivity. In particular, poly(3,4-ethylenedioxythiophene) (commonly known as PEDOT) is more preferable because obtaining higher conductivity and more excellent heat resistance. The conjugated conductive polymer may be a copolymer (PEDOT copolymer) of 3,4-ethylenedioxythiophene and another monomer (e.g., pyrrole). The content derived from 3,4-ethylenedioxythiophene in this PEDOT copolymer is preferably 70 mass % or more, more preferably 80 mass % or more, further more preferably 90 mass % or more, still further more preferably 100 mass % or more.

The conjugated conductive polymer can be used one kind alone or in combination with two or more kinds. The total amount of PEDOT and a PEDOT copolymer in the conjugated conductive polymer is preferably 70 mass % or more, more preferably 80 mass % or more, further more preferably 90 mass % or more, still further more preferably 100 mass % or more.

Monomer

As the monomer for obtaining a conjugated conductive polymer, at least one selected from a pyrrole containing or not containing a substituent, an aniline containing or not containing a substituent, and a thiophene containing or not containing a substituent are preferably used. Examples of the substituent include an alkyl group with 1 to 18 carbon atoms, an aryl group with 6 to 10 carbon atoms, a heteroaryl group with 5 to 10 carbon atoms, an alkoxy group with 1 to 18 carbon atoms, and an alkylthio group with 1 to 18 carbon atoms, a carboxyl group, a hydroxyl group, a halogen atom, and a cyano group. The alkyl group, the aryl group, the heteroaryl group, the alkoxy group, and the alkylthio group may be substituted with a carboxyl group, a hydroxyl group, a halogen atom, or a cyano group. Furthermore, two or more substituents may be condensed to form a ring.

Specific examples of the monomer include pyrrole, N-methylpyrrole, 3-methylpyrrole, 3-ethylpyrrole, 3-n-propylpyrrole, 3-butylpyrrole, 3-octylpyrrole, 3-decylpyrrole, 3-dodecylpyrrole, 3,4-dimethylpyrrole, 3,4-dibutylpyrrole, 3-carboxypyrrole, 3-methyl-4-carboxypyrrole, 3-methyl-4-carboxyethylpyrrole, 3-methyl-4-carboxybutylpyrrole, 3-hydroxypyrrole, 3-methoxypyrrole, 3-ethoxypyrrole, 3-butoxypyrrole, 3-hexyloxypyrrole, and 3-methyl-4-hexyloxypyrrole.

Specific examples of the monomer also include thiophene, 3-methylthiophene, 3-ethylthiophene, 3-propylthiophene, 3-butylthiophene, 3-hexylthiophene, 3-heptylthiophene, 3-octylthiophene, 3-decylthiophene, 3-dodecylthiophene, 3-octadecylthiophene, 3-bromothiophene, 3-chlorothiophene, 3-iodothiophene, 3-cyanothiophene, 3-phenylthiophene, 3,4-dimethylthiophene, 3,4-dibutylthiophene, 3-hydroxythiophene, 3-methoxythiophene, 3-ethoxythiophene, 3-butoxythiophene, 3-hexyloxythiophene, 3-heptyloxythiophene, 3-octyloxythiophene, 3-decyloxythiophene, 3-dodecyloxythiophene, 3-octadecyloxythiophene, 3,4-dihydroxythiophene, 3,4-dimethoxythiophene, 3,4-diethoxythiophene, 3,4-dipropoxythiophene, 3,4-dibutoxythiophene, 3,4-dihexyloxythiophene, 3,4-diheptyloxythiophene, 3,4-dioctyloxythiophene, 3,4-didecyloxythiophene, 3,4-didodecyloxythiophene, 3,4-ethylenedioxythiophene, 3,4-propylenedioxythiophene, 3,4-butylenedioxythiophene, 3-methyl-4-methoxythiophene, 3-methyl-4-ethoxythiophene, 3-carboxythiophene, 3-methyl-4-carboxythiophene, 3-methyl-4-carboxyethylthiophene, 3-methyl-4-carboxybutylthiophene, and 3,4-ethyleneoxythiathiophene. Specific examples of the monomer also include aniline, 2-methylaniline, 3-isobutylaniline, 2-anilinesulfonic acid, and 3-anilinesulfonic acid. The monomer for obtaining a conjugated conductive polymer can be used one kind alone or in combination with two or more kinds.

The monomer for obtaining a conjugated conductive polymer preferably contains a compound expressed by the following formula (I), more preferably the following formula (II), and further preferably contains 3,4-ethylenedioxythiophene.

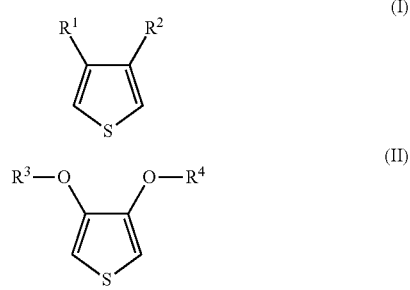

In the formula (I), $R^1$ and $R^2$ each independently represent a hydrogen atom, a hydroxyl group, an alkyl group with 1 to 18 carbon atoms containing or not containing a substituent, an alkoxy group with 1 to 18 carbon atoms containing or not containing a substituent, or an alkylthio group with 1 to 18 carbon atoms containing or not containing a substituent, or may bind to each other to form a ring such as an alicycle with 3 to 10 carbon atoms containing or not containing a substituent, an aromatic ring with 6 to 10 carbon atoms containing or not containing a substituent, an oxygen atom-containing hetero ring with 2 to 10 carbon atoms containing or not containing a substituent, a sulfur atom-containing hetero ring with 2 to 10 carbon atoms containing or not containing a substituent, or an oxygen and sulfur atom-containing hetero ring with 2 to 10 carbon atoms containing or not containing a substituent. "$R^1$ and $R^2$ bind to each other to form a ring" means "$R^1$ and $R^2$ bind to each other to form a ring with two of the carbon atoms of the thiophene backbone in the formula (I)." The carbon atoms of the ring formed by $R^1$ and $R^2$ that bind to each other include two of the carbon atoms of the thiophene backbone.

Examples of the substituent include an alkyl group with 1 to 18 carbon atoms, an aryl group with 6 to 10 carbon atoms, a heteroaryl group with 5 to 10 carbon atoms, an alkoxy group with 1 to 18 carbon atoms, and an alkylthio group with 1 to 18 carbon atoms, a carboxyl group, a hydroxyl group, a halogen atom, and a cyano group. The alkyl group, the aryl group, the heteroaryl group, the alkoxy group, and the alkylthio group may be substituted with a carboxyl group, a hydroxyl group, a halogen atom, or a cyano group. Furthermore, two or more substituents may be condensed to form a ring.

Examples of the above-mentioned oxygen atom-containing hetero ring include an oxirane ring, an oxetane ring, a furan ring, a hydrofuran ring, a pyran ring, a pyrone ring, a dioxane ring, and a trioxane ring.

Examples of the above-mentioned sulfur atom-containing hetero ring include a thiirane ring, a thietane ring, a thiophene ring, a thiane ring, a thiopyran ring, a thiopyrylium ring, a benzothiopyran ring, a dithiane ring, a dithiolane ring, and a trithiane ring.

Examples of the above-mentioned oxygen and sulfur atom-containing hetero ring include an oxathiolane ring and an oxathiane ring.

The content of the compound expressed by the formula (I) based on the total amount of the monomer for obtaining a conjugated conductive polymer is preferably 70 mass % or more, more preferably 80 mass % or more, further more preferably 90 mass % or more, still further more preferably 100 mass % or more.

In the formula (II), $R^3$ and $R^4$ each independently represent a hydrogen atom, an alkyl group with 1 to 4 carbon atoms containing or not containing a substituent or may bind to each other to form a ring such as an oxygen atom-containing hetero ring with 3 to 6 carbon atoms containing or not containing a substituent. "$R^3$ and $R^4$ bind to each other to form a ring" means "$R^3$ and $R^4$ bind to each other to form a ring with two of the carbon atoms of the thiophene backbone in the formula (II)." The carbon atoms of the ring formed by $R^3$ and $R^4$ that bind to each other include two of the carbon atoms of the thiophene backbone.

$R^3$ and $R^4$ preferably bind to each other to form an oxygen atom-containing hetero ring with 3 to 6 carbon atoms containing or not containing a substituent. Examples of the oxygen atom-containing hetero ring include a dioxane ring and a trioxane ring. Of these rings, a dioxane ring is preferable. Examples of the substituent include an alkyl group with 1 to 18 carbon atoms, an aryl group of with 6 to 10 carbon atoms, a heteroaryl group with 5 to 10 carbon atoms, an alkoxy group with 1 to 18 carbon atoms, and an alkylthio group of with 1 to 18 carbon atoms, a carboxyl group, a hydroxyl group, a halogen atom, and a cyano group. The alkyl group, the aryl group, the heteroaryl group, the alkoxy group, and the alkylthio group may be substituted with a carboxyl group, a hydroxyl group, a halogen atom, or a cyano group. Furthermore, two or more substituents may be condensed to form a ring.

The content of the compound expressed by the formula (II) is preferably 70 mass % or more, more preferably 80 mass % or more, further more preferably 90 mass % or more, still further more preferably 100 mass % or more, based on the total amount of the monomer for obtaining a conjugated conductive polymer.

Seed Particle

The seed particle used in the present invention only has to have protective colloid formed of a polyanion in a dispersion medium. Preferable examples of the seed particle include a homopolymer or a copolymer particle obtained by polymerizing an ethylenically unsaturated monomer.

The ethylenically unsaturated monomer only has to have at least one polymerizable vinyl group. Examples of the ethylenically unsaturated monomer include (meth)acrylic esters with a linear, a branched, or a cyclic alkyl chain; an aromatic vinyl compound such as styrene and α-methylstyrene; a heterocyclic vinyl compound such as vinylpyrrolidone; vinylesters such as hydroxyalkyl (meth)acrylate, dialkylaminoalkyl (meth)acrylate, vinyl acetate, and vinyl alkanoate; monoolefins such as ethylene, propylene, butylene, and isobutylene; conjugated diolefins such as butadiene, isoprene, and chloroprene; α,β-unsaturated mono- or di-carboxylic acids such as acrylic acid, methacrylic acid, crotonic acid, itaconic acid, maleic acid, and fumaric acid; a vinyl cyanide compound such as acrylonitrile; and carbonyl group-containing ethylenically unsaturated monomers such as acrolein and diacetone acrylamide. These ethylenically unsaturated monomers may be used one kind alone or in combination with two or more kinds.

The ethylenically unsaturated monomers are preferably at least one kind of the above-mentioned aromatic vinyl compounds and (meth)acrylic esters.

If the ethylenically unsaturated monomers contain an aromatic vinyl compounds, the content is preferably from 50 to 100 mass %, more preferably from 70 to 100 mass %, further more preferably from 90 to 100 mass %. Among the above-mentioned aromatic vinyl compounds, styrene is preferable.

If the ethylenically unsaturated monomers contain a (meth)acrylic ester, the content is preferably from 50 to 100 mass %, more preferably from 70 to 100 mass %, further more preferably from 90 to 100 mass %. Among the above-mentioned (meth)acrylic esters, at least one of methyl (meth)acrylate and tert-butyl (meth)acrylate is preferable, at least one of methyl methacrylate and tert-butyl methacrylate is more preferable, and methyl methacrylate is further more preferable.

The ethylenically unsaturated monomers are preferably at least one kind of styrene, methyl methacrylate, and tert-butyl methacrylate.

Optionally, a cross-linkable monomer such as an epoxy group-containing α,β-ethylenically unsaturated compound such as glycidyl (meth)acrylate; a hydrolyzable alkoxysilyl group-containing α,β-ethylenically unsaturated compound such as vinyltriethoxysilane and γ-methacryloxypropyltrimethoxysilane; or a polyfunctional vinyl compound such as ethyleneglycol di(meth)acrylate, trimethylolpropane tri (meth)acrylate, allyl (meth)acrylate, divinylbenzene, or diallylphthalate may be introduced to a homopolymer or a copolymer to cross-link this homopolymer or copolymer alone or in combination with an ethylenically unsaturated compound component with an active hydrogen group. Alternatively, a cross-linkable monomer such as a carbonyl group-containing α,β-ethylenically unsaturated compound (in particular, limited to those containing a keto group) may be introduced to a homopolymer or a copolymer to cross-link this homopolymer or copolymer in combination with a poly hydrazine compound (in particular, a compound with two or more hydrazide groups, such as oxalic acid dihydrazide, succinic acid dihydrazide, adipic acid dihydrazide, or polyacrylic acid hydrazide). Introducing a cross-linkable monomer to a homopolymer or a copolymer in such a manner can improve the water resistance, the moisture resistance, and the heat resistance of the conjugated conductive polymer. The cross-linkable monomer is more preferably divinylbenzene.

The content of the cross-linkable monomer in a homopolymer or a copolymer is preferably from 1 to 30 mass %, more preferably from 3 to 20 mass %, further more preferably from 5 to 15 mass %, still further more preferably from 8 to 12 mass %.

Polyanion

The polyanion used in the present invention is a polymer with an anionic group. Examples of the anionic group include groups composed of sulfonic acid or salts thereof, phosphoric acid or salts thereof, monosubstituted phosphate groups, carboxylic acid or salts thereof, and monosubstituted sulfate groups. Among these, strong acid groups are preferable, groups composed of sulfonic acid or salts thereof and phosphoric acid or salts thereof are more preferable, and groups composed of sulfonic acid or salts thereof are further more preferable. The anionic group may be directly attached to the polymer main chain or the side chains. The anionic group is preferably attached to the side-chain ends to produce a prominent doping effect.

The polyanion may have a substituent other than the anionic group. Examples of such a substituent include an alkyl group, a hydroxy group, an alkoxy group, a phenol group, a cyano group, a phenyl group, a hydroxyphenyl group, an ester group, a halogeno group, an alkenyl group, an imide group, an amide group, an amino group, an oxycarbonyl group, and a carbonyl group. Among these, an alkyl group, a hydroxy group, a cyano group, a phenol group, and an oxycarbonyl group are preferable, and an alkyl group, a hydroxy group, and a cyano group are more preferable. The substituent may be directly attached to the polymer main chain or the side chains. The substituent is preferably attached to the side-chain ends to produce their own action.

The alkyl groups substituted in the polyanion have a promising effect in enhancing the solubility and the dispersibility of a polyanion in a dispersion medium and the compatibility with and the dispersibility in the conjugated conductive polymer. Examples of the alkyl groups include linear alkyl groups such as a methyl group, an ethyl group, a propyl group, a butyl group, an isobutyl group, a t-butyl group, a pentyl group, a hexyl group, an octyl group, a decyl group, and a dodecyl group; and cycloalkyl groups such as a cyclopropyl group, a cyclopentyl group, and a cyclohexyl group. In consideration of the solubility in a dispersion medium, the dispersibility in the conjugated conductive polymer, the steric hindrance, etc., alkyl groups with from 1 to 12 carbon atoms are more preferable.

The hydroxy groups substituted in the polyanion easily form a hydrogen bond with other hydrogen atoms, etc. and have a promising effect in enhancing the dispersibility of the polyanion in a dispersion medium and the compatibility with, the dispersibility in, and the adhesiveness to the conjugated conductive polymer. The hydroxy groups attached to the ends of C1 to C6 alkyl groups attached to the polymer main chain are preferable.

The cyano and the hydroxyphenyl groups substituted in the polyanion have a promising effect in enhancing the dispersibility of the polyanion in a dispersion medium and the compatibility with the conjugated conductive polymer, and the heat resistance. The cyano groups directly attached to the polymer main chain or attached to the ends of C1 to C7 alkyl groups or C2 to C7 alkenyl groups attached to the polymer main chain are preferable.

Among the oxycarbonyl groups substituted in the polyanion, alkyloxycarbonyl groups and aryloxy carbonyl groups that are directly attached to the polymer main chain or attached to the polymer main chain through a functional group are preferable.

The polymer main chain of the polyanion is not limited in particular. Examples of the polymer main chain include polyalkylenes, polyimides, polyamides, and polyesters. Among these, polyalkylenes are preferable in terms of easy synthesis and obtainability.

Polyalkylenes are a polymer with the repeat unit of an ethylenically unsaturated monomer. The polyalkylenes may have a carbon-carbon double bond on the main chain. Examples of the polyalkylenes include polyethylene, polypropylene, polybutene, polypentene, polyhexene, polyvinyl alcohol, polyvinyl phenol, poly(3, 3, 3-trifluoropropylene), polyacrylonitrile, polyacrylate, polymethacrylate, polystyrene, polybutadiene, and polyisoprene Examples of the polyimides are obtained by polycondensing an acid anhydride such as pyromellitic dianhydride, biphenyltetracarboxylic dianhydride, benzophenonetetracarboxylic dianhydride, 2,2,3,3-tetra carboxydiphenyl ether dianhydride, or 2,2-[4,4'-di(dicarboxyphenyloxy)phenyl] propane dianhydride with a diamine such as oxydianiline, paraphenylenediamine, meta phenylenediamine, or benzophenonediamine.

Examples of the polyamides include polyamide 6, polyamide 6,6, and polyamide 6,10.

Examples of the polyesters include polyethylene terephthalate and polybutylene terephthalate.

Specific examples of the polymers with a sulfonate group, which are suitably used as the polyanion, include polyvinylsulfonate, polystyrenesulfonate, polyallylsulfonate, polyethyl acrylate sulfonic acid, polybutyl acrylate sulfonic acid, poly(2-acrylamide-2-methylpropanesulfonic acid), and polyisoprene sulfonic acid. These may be a homopolymer or a copolymer of two or more kinds of monomers. Among these, polystyrenesulfonate, polyisoprene sulfonic acid, polyethyl acrylate sulfonic acid, and polybutyl acrylate sulfonic acid are preferable, and polystyrenesulfonate (commonly known as PSS) is more preferable in terms of the addition of conductivity.

The polyanion, particularly the polymer with a sulfonate group, suppresses the pyrolysis of the conjugated conductive polymer, enhances the dispersibility of the monomer for obtaining a conjugated conductive polymer in a dispersion medium, and serves as a dopant for the conjugated conductive polymer.

The polyanion used in the present invention has a weight average molecular weight of preferably from 1,000 to 1,000,000, more preferably from 5,000 to 300,000, further more preferably from 8,000 to 200,000, still further more preferably from 9,000 to 150,000. The weight average molecular weight in this range enhances the solubility of the polyanion in a dispersion medium and successfully dopes the conjugated conductive polymer with the polyanion. The weight average molecular weight is measured as polystyrene-equivalent molecular weight by gel permeation chromatography.

The polyanion with the above-mentioned characteristics may be selected from commercially available ones or may be obtained by a well-known synthesis method. Examples of the synthesis method of the polyanion are described in Houben-Weyl, "Methoden derorganischen Chemle" Vol. E20, Makromolekulare Stoffe, No. 2 (1987) p 1141, Patent Document 3, etc.

The total amount used of the anionic group in the polyanion to be used to form protective colloid on the seed particle and to be prepared before initiation of the polymerization or to be added during the polymerization is preferably from 0.25 to 30 mol, more preferably from 0.8 to 25 mol, further more preferably from 1 to 10 mol, still further more preferably from 2 to 5 mol, based on 1 mol of the monomer for obtaining a conjugated conductive polymer.

The amount used of the polyanion is preferably from 10 to 30,000 parts by mass, more preferably from 50 to 25,000 parts by mass, further more preferably from 100 to 1,000 parts by mass, still further more preferably from 200 to 500 parts by mass, based on 100 parts by mass of the conjugated conductive polymer in this step.

Too much amount used of the polyanion is likely to decrease the conductivity of the conjugated conductive polymer. On the other hand, too small amount used is likely to decrease the dispersibility of the conjugated conductive polymer in a dispersion medium.

Preparation of Seed Particle with Protective Colloid

The seed particle has protective colloid formed of a polyanion in a dispersion medium. The dispersion liquid containing the seed particle with protective colloid formed of a polyanion dispersed in a dispersion medium can be prepared by resin emulsion polymerization.

The resin emulsion polymerization is radical polymerization, which is conducted with a normal pressure reactor or a pressure-tight reactor by a batch, a semicontinuous, or a continuous method. Preferably, the ethylenically unsaturated monomer and the polyanion are dissolved, emulsified, or dispersed in the respective dispersion media, and then the ethylenically unsaturated monomer solution is continuously or intermittently added and polymerized in the polyanion-containing solution, in terms of polymerization stability and polymer homogeneity.

The reaction temperature is typically from 10 to 100° C., generally from 30 to 90° C., preferably from 60 to 90° C. The reaction time is not limited in particular and may be appropriately adjusted according to the amount used of each component, the kind of polymerization initiator, the reaction temperature, etc.

In the radical polymerization, the protective colloidal polyanion contributes to the stability of the emulsion particles, but an emulsifier such as an anionic emulsifier, a nonionic emulsifier, or a reactive emulsifier, or an aliphatic amine may be optionally added in the polymerization system. The kind and the amount used of the emulsifier or the aliphatic amine may be appropriately adjusted according to various conditions including the amount used of the polyanion and the composition of the ethylenically unsaturated monomer.

Examples of the emulsifier used for the radical polymerization include anionic emulsifiers such as alkyl sulfonic acid salts, alkylbenzene sulfonic acid salts, alkyl sulfosuccinate salts, alkyl diphenyletherdisulfonic acid salts, polyoxyalkylene alkyl sulfuric acid salts, and polyoxyalkylene alkyl phosphates; and nonionic surfactants such as polyoxyalkylene alkylethers, polyoxyalkylene alkylphenolethers, polyoxyalkylene fatty acid esters, and polyoxyalkylene sorbitan fatty acid esters.

Examples of the aliphatic amine include primary amines such as octylamine, laurylamine, myristylamine, stearylamine, and oleylamine; secondary amines such as dioctylamine, dilaurylamine, distearylamine, and dioleoylamine; and tertiary amines such as N,N-dimethyllaurylamine, N,N-dimethylmyristylamine, N,N-dimethylpalmitylamine, N,N-dimethylstearylamine, N,N-dimethylbehenylamine, N,N-dimethyloleylamine, N-methyldidecylamine, and N-methyldioleylamine.

The emulsifier and the aliphatic amine may be used one kind alone or in combination with two or more kinds.

Furthermore, water-soluble polymers such as polyvinyl alcohol, methylcellulose, carboxymethylcellulose, hydroxyethylcellulose, hydroxypropylcellulose, and polyvinylpyrrolidone may be used unless losing the characteristics of the obtained conjugated conductive polymer.

The dispersion medium is an aqueous medium. Examples of the dispersion medium include water or mixed solvents of water and water-soluble solvent. The content of the water-soluble solvent in the mixed solvent is preferably from 0 to 30 mass %. When the content of the water soluble solvent is 30 mass % or less, the polymerization stability of the synthetic resin emulsion is likely to be improved. Examples of the water-soluble solvent include alcohols such as methanol, ethanol, and isopropyl alcohol; ketone such as acetone; glycols such as ethylene glycol and propylene glycol; and ethers such as ethylene glycol monomethyl ether and ethylene glycol monobutyl ether.

In the radical polymerization, a well-known common polymerization initiator can be used. Examples of the polymerization initiator include inorganic peroxides such as hydrogen peroxide, persulfate, ammonium persulfate, potassium persulfate, and sodium persulfate; organic peroxides such as benzoyl peroxide and t-butyl hydroperoxide; and azo compounds such as 2,2'-azobisisobutyronitrile and 4,4'-azobis(4-cyano valeric acid). Among these, inorganic peroxides are preferable, at least one kind of ammonium persulfate and potassium persulfate is more preferable, and potassium persulfate is more preferable. The polymerization initiator may be optionally combined with sodium sulfoxylate formaldehyde, ascorbic acids, sulfites, tartaric acid or a salt thereof, or iron (II) sulfate for redox polymerization. Furthermore, a chain transfer agent such as an alcohol or a mercaptan may be optionally used.

The amount used of the ethylenically unsaturated monomer is preferably from 10 to 100 parts by mass, more preferably from 20 to 90 parts by mass, further more preferably from 30 to 70 parts by mass, still further more preferably from 35 to 50 parts by mass, based on 100 parts by mass of the amount used of the polyanion in the preparation of the seed particle with protective colloid. When the amount used of the ethylenically unsaturated monomer is 10 parts by mass or more, the content of the conjugated conductive polymer is relatively reduced to easily produce an effect in suppressing the thickening during the polymerization. When the amount used is 100 parts by mass or less, the stability of the seed particle with protective colloid is improved.

The particle size D50 (median size at 50% on volumetric basis) of the seed particle with protective colloid dispersed in the dispersion medium is preferably from 0.01 to 10 μm, more preferably from 0.05 to 1 μm, further more preferably from 0.1 to 0.8 μm. The particle size distribution of the seed particle can be measured with a particle size distribution measurement device "microtrac UPA" available from NIK-KISO Co., Ltd. When the particle size D50 of the seed particle dispersed in the dispersion medium is 0.01 μm or more, the dispersibility of the seed particle is improved. When the particle size D50 is 10 μm or less, the particle settling is suppressed.

Polymerization of Monomer

The monomer for obtaining a conjugated conductive polymer is polymerized in a dispersion medium containing a monomer for obtaining a conjugated conductive polymer and a seed particle with protective colloid formed of a polyanion.

Monomer Liquid

To polymerize the monomer for obtaining a conjugated conductive polymer in the dispersion medium, the monomer, the dispersion liquid containing the seed particle with protective colloid formed of a polyanion (resin emulsion), and optionally an additive are added to the dispersion medium to obtain a dispersion liquid containing the monomer and the seed particle with protective colloid (hereinafter sometimes referred to as "monomer liquid").

This monomer liquid may be prepared with a high-powered mixer such as a homogenizer. However, this preparation is preferably conducted under ultrasonic irradiation. The ultrasonic irradiation energy is not limited in particular as long as obtaining homogeneous monomer liquid. The ultrasonic irradiation is preferably conducted at a power consumption of from 5 to 500 W/L (liter) for an irradiation time of from 0.1 to 10 hours/L (liter). The power consumption is more preferably from 100 to 500 W/L, further more preferable from 200 to 500 W/L, still further more preferable from 200 to 400 W/L. The irradiation time is more preferably from 0.5 to 8 hours/L, further more preferably from 1 to 6 hours/L, still further more preferably from 2 to 5 hours/L.

In a dispersion medium containing the monomer for obtaining a conjugated conductive polymer before the polymerization and the seed particle with protective colloid formed of a polyanion, a predetermined amount of the same polyanion as that is used to form the seed particle with protective colloid can be additionally contained from the viewpoint of suppressing the agglomeration of the conjugated conductive polymer generated during the polymerization.

This polyanion can be added and dissolved, emulsified, or dispersed in the monomer liquid. If the polyanion is contained in the monomer liquid in addition to the dispersion liquid of the seed particle with protective colloid, the amount of the polyanion before the polymerization is preferably from 5 to 99 mass %, more preferably from 10 to 90 mass %, further more preferably from 20 to 80 mass % based on the total amount of the polyanion expect for the protective colloid formed of a polyanion on the seed particle.

Dispersion Medium

The dispersion medium used to polymerize the monomer is not limited in particular as long as the conductive polymer-containing particles composed of the conjugated conductive polymer and the seed particle with protective colloid formed of a polyanion are dispersed in the dispersion medium. However, the same dispersion medium as that used for the dispersion liquid containing the seed particle is preferable.

Examples of the dispersion medium include water; amides such as N-vinylpyrrolidone, hexamethylphosphortriamide, N-vinylformamide, and N-vinylacetamide; phenols such as cresol, phenol, and xylenol; polyvalent alcohols such as dipropylene glycol, 1,3-butylene glycol, 1,4-butylene glycol, diglycerin, isoprene glycol, butanediol, 1,5-pentanediol, 1,6-hexanediol, 1,9-nonanediol, and neopentyl glycol; carbonate compounds such as ethylene carbonate and propylene carbonate; ethers such as dioxane, diethyl ether, propylene glycol dialkyl ether, polyethylene glycol dialkyl ether, and polypropylene glycol dialkyl ether; a heterocyclic compound such as 3-methyl-2-oxazolidinone; and nitriles such as acetonitrile, glutarodinitrile, methoxyacetonitrile, propionitrile, and benzonitrile.

The dispersion medium can be used one kind alone or in combination with two or more kinds. The dispersion medium contains preferably from 1 to 100 mass %, more preferably from 50 to 100 mass %, further more preferably from 80 to 100 mass %, still further more preferably from 90 to 100 mass % of water. Yet still further more preferably, water is used alone for the dispersion medium.

The amount used of the dispersion medium is preferably from 1 to 50,000 parts by mass, more preferably from 50 to 10,000 parts by mass, further more preferably from 1,000 to 5,000 parts by mass, still further more preferably from 2,000 to 3,500 parts by mass, based on 100 parts by mass of the total amount of the monomer for obtaining a conjugated conductive polymer and seed particle with protective colloid formed of a polyanion. Too small amount used of the dispersion medium is likely to increase the viscosity of the dispersion liquid. Too much amount used is likely to decrease the productivity of the solid electrolytic capacitor because it takes time to remove the dispersion medium from the dispersion liquid.

Oxidant

When the monomer is polymerized, for example, when the dispersion liquid containing polypyrroles and polythiophenes as the conjugated conductive polymer is prepared, the polymerization starts with a predetermined temperature in the presence of an oxidant.

Examples of the oxidant include peroxodisulfuric acid; peroxodisulfuric acid salts such as ammonium peroxodisulfate (ammonium persulfate), sodium peroxodisulfate (sodium persulfate), and potassium peroxodisulfate (potassium persulfate); a metal halogenated compound such as boron trifluoride; transition metal compounds such as iron (III) chloride, iron (III) sulfate, and cupric chloride; metal oxides such as silver oxide and cesium oxide; peroxides such as hydrogen peroxide and ozone; an organic peroxide such as benzoyl peroxide; and oxygen. Among these, peroxodisulfuric acid and peroxodisulfuric acid salts are preferable, peroxodisulfuric acid salts are more preferable, at least one kind of ammonium peroxodisulfate (ammonium persulfate) and sodium peroxodisulfate (sodium persulfate) is further more preferable, and the sodium peroxodisulfate (sodium persulfate) is still more preferable.

The oxidant can be used one kind alone or in combination with two or more kinds.

The content of the oxidant is preferably from 50 to 500 parts by mass, more preferably from 100 to 300 parts by mass, further more preferably from 150 to 250 parts by mass, based on 100 parts by mass of the monomer for obtaining a conjugated conductive polymer.

Oxidation Catalyst

When the monomer is polymerized, an oxidation catalyst may be used. The oxidation catalyst is preferably iron p-toluenesulfonate.

The content of the oxidation catalyst is preferably from 1 to 20 parts by mass, more preferably from 3 to 15 parts by mass, further more preferably from 5 to 10 parts by mass based on 100 parts by mass of the monomer for obtaining a conjugated conductive polymer.

Polymerization Temperature

The polymerization temperature in the polymerization of the monomer is typically from 5 to 80° C., preferably from 10 to 60° C., more preferably from 15 to 40° C.

The temperature within this range can polymerize the monomer at a moderate reaction rate, suppress the increase in the viscosity, prepare the dispersion liquid containing the conjugated conductive polymer within an economical and stable time, and be likely to increase the conductivity of the obtained conjugated conductive polymer. The polymerization temperature can be controlled with a well-known heater and an air conditioner. The monomer may be polymerized while the polymerization temperature is changed within the above-mentioned range as needed.

Dispersion Treatment

In the step to obtain a conjugated conductive polymer-containing dispersion liquid, the generated conjugated conductive polymer is preferably subjected to dispersion treatment during the polymerization of the monomer.

This dispersion treatment may be conducted with a high-powered mixer such as a homogenizer. However, this preparation is preferably conducted under ultrasonic irradiation. This dispersion treatment can suppress the agglomeration of the conjugated conductive polymer with a long main chain. The ultrasonic irradiation energy is not limited in particular as long as suppressing the agglomeration of the conjugated conductive polymer. The ultrasonic irradiation is preferably conducted at a power consumption of preferably from 5 to 500 W/L, more preferably from 100 to 500 W/L, further more preferably from 200 to 500 W/L, until the reaction ends.

Addition of Dispersion Liquid Containing Seed Particle

An additional dispersion liquid containing a seed particle with protective colloid formed of a polyanion is preferably added during the polymerization of the monomer. Additionally adding a part of a predetermined amount of the dispersion liquid containing the seed particle with protective colloid formed of a polyanion during the polymerization of the monomer can suppress the thickening of the reaction liquid during the polymerization, improve the mixing efficiency, and reduce the load to the manufacturing equipment.

The amount of the additional dispersion liquid containing the seed particle with protective colloid to be added during the polymerization is preferably from 10 to 90 mass %, more preferably from 20 to 70 mass %, further more preferably from 25 to 50 mass %, still further more preferably from 30 to 45 mass %, based on the total amount used of the dispersion liquid containing the seed particle with protective colloid.

Addition of Polyanion

During the polymerization of the monomer, the polyanion used to form protective colloid on the seed particle may be additionally added. Additionally adding a part of a predetermined amount of the polyanion during the polymerization of the monomer can suppress the thickening of the reaction liquid during the polymerization, improve the mixing efficiency, and reduce the load to the manufacturing equipment.

The amount of the additional polyanion to be added during the polymerization is preferably from 0 to 90 mass %, more preferably from 20 to 70 mass %, based on the total amount used of the polyanion.

Additive

An additive may be optionally added in the monomer liquid or the conjugated conductive polymer-containing dispersion liquid to be obtained.

The additive is not limited in particular as long as mixed with the conjugated conductive polymer and the seed particle with protective colloid formed of a polyanion. Examples of the additive include water-soluble polymer compounds, water-dispersible compounds, alkaline compounds, surfactants, antifoams, couplers, antioxidants, and electric conductivity improvers. The additive can be used one kind alone or in combination with two or more kinds.

The water-soluble polymer compound is a water-soluble polymer with a cationic group and a nonionic group on the main chain or the side chains. Specific examples of the water-soluble polymer compound include polyoxyalkylenes, water-soluble polyurethanes, water-soluble polyesters, water-soluble polyamides, water-soluble polyimides, water-soluble polyacryls, water-soluble polyacrylamides, polyvinyl alcohols, and polyacrylic acids. Among these, polyoxyalkylenes are desirable.

Specific examples of the polyoxyalkylenes include diethylene glycol, triethylene glycol, oligopolyethylene glycol, triethylene glycol monochlorohydrin, diethylene glycol monochlorohydrin, oligoethylene glycol monochlorohydrin, triethylene glycol monobromohydrin, diethylene glycol monobromohydrin, oligoethylene glycol monobromohydrin, polyethylene glycol, glycidyl ether, polyethylene glycol glycidyl ether, polyethylene oxide, triethylene glycol dimethyl ether, tetraethylene glycol dimethyl ether, diethylene glycol dimethyl ether, diethylene glycol diethyl ether diethylene glycol dibutyl ether, dipropylene glycol, tripropylene glycol, polypropylene glycol, polypropylene dioxide, polyoxyethylene alkyl ether, polyoxyethylene glycerine fatty acid ester, and polyoxyethylene fatty acid amide.

The water-dispersible compound is formed by substituting a part of a low hydrophilic compound with a high hydrophilic functional group or by adsorbing a compound with a high hydrophilic functional group on a low hydrophilic compound (e.g. emulsion). The water-dispersible compound is dispersed without being precipitated in water. The specific examples of the water-dispersible compound include polyester, polyurethane, acrylic resin, silicone resin, and the emulsion thereof.

The water-soluble polymer compound and the water-dispersible compound can be used one kind alone or in combination with two or more kinds. Adding the water-soluble polymer compound and the water-dispersible compound can adjust the viscosity of the dispersion liquid containing the conjugated conductive polymer and improves the application properties.

When the water-soluble polymer compound and the water-dispersible compound are added, the total amount is preferably from 1 to 4000 parts by mass, more preferably from 50 to 2000 parts by mass, based on 100 parts by mass of the total amount of the conjugated conductive polymer and the seed particle with protective colloid formed of a polyanion. Too much amount added of the water-soluble polymer compound and the water-dispersible compound is likely to reduce the conductivity and the equivalent series resistance (ESR) characteristics of solid electrolytic capacitors.

An alkaline compound may be added in the dispersion liquid containing the conjugated conductive polymer. This addition of an alkaline compound can provide corrosion resistance to articles to which the dispersion liquid is applied and adjust the pH of the conjugated conductive polymer-containing dispersion liquid. For example, to prevent the metal and the metal oxide used for the solid electrolytic capacitor from being corroded, the pH is preferably adjusted to from 3 to 13, more preferably from 4 to 7. When the pH is 3 or more, the corrosion of the valve metal such as aluminum may not be progressed. When the pH is 13 or less, the conjugated conductive polymer doped with the polyanion may not be dedoped.

As the alkaline compound, well-known inorganic alkaline compounds and organic alkaline compounds can be used. Examples of the inorganic alkaline compounds include ammonia, sodium hydroxide, potassium hydroxide, and calcium hydroxide. Examples of the organic alkaline compounds include aromatic amines, aliphatic amines, and alkaline metal alkoxides.

Among the aromatic amines, nitrogen-containing heteroaryl cyclic compounds are preferable. The nitrogen-containing heteroaryl cyclic compounds are a nitrogen-containing hetero cyclic compound with aromaticity. In the aromatic amines, the nitrogen atom contained in the heterocycle has conjugate relationship with other atoms.

Examples of the nitrogen-containing heteroaryl cyclic compounds include pyridines, imidazoles, pyrimidines, pyrazines, and triazines. Among these, pyridines, imidazoles, and pyrimidines are preferable from the viewpoint of solvent solubility.

Examples of the aliphatic amines include ethylamine, n-octylamine, diethylamine, diisobutylamine, methylethylamine, trimethylamine, triethylamine, allylamine, 2-ethylaminoethanol, 2,2'-iminodiethanol, and N-ethylethylenediamine.

Examples of the alkaline metal alkoxides include sodium alkoxides such as sodium methoxide and sodium ethoxide; potassium alkoxide; and calcium alkoxides.

Examples of the surfactants include anionic surfactants such as carboxylic acid salts, sulfonic acid salts, sulfate salts, and phosphate salts; cationic surfactants such as amine salts and quaternary ammonium salts; amphoteric surfactants such as carboxybetaine, aminocarboxylic acid salts, and imidazoliumbetaine; and nonionic surfactants such as polyoxyethylene alkyl ether, polyoxyethylene glycerine fatty acid ester, ethylene glycol fatty acid ester, and polyoxyethylene fatty acid amide.

Examples of the antifoams include silicone resin and polydimethylsiloxane.

Examples of the antioxidants include phenolic antioxidants, amine antioxidants, phosphorus antioxidants, sulfur antioxidants, saccharides, and vitamins.

The electric conductivity improvers are not limited in particular as long as increasing the electric conductivity of the dispersion liquid containing the conjugated conductive polymer. Examples of the electric conductivity improvers include compounds containing an ether bond, such as tetrahydrofuran; compounds containing a lactone group, such as γ-butyrolactone and γ-valerolactone; amides and compounds containing a lactam group, such as caprolactam, N-methylcaprolactam, N,N-dimethylacetamide, N-methylacetamide, N,N-dimethylformamide, N-methylformamide, N-methylformanilide, N-methylpyrrolidone, N-octylpyrrolidone, and pyrrolindone; sulphone compounds and sulphoxide compounds, such as tetramethylene sulfone and dimethyl sulfoxide; saccharides such as sucrose, glucose, fructose, and lactose and derivative thereof; sugar alcohols such as sorbitol and mannitol; imides such as succinimide and maleimide; furan derivatives such as 2-furancarboxylic acid and 3-furancarboxylic acid; and dialcohols and polyalcohols such as ethylene glycol, propylene glycol, glycerin, diethylene glycol, and triethylene glycol. Among these, tetrahydrofuran, N-methylformamide, N-methylpyrrolidone, ethylene glycol, propylene glycol, glycerin, dimethyl sulfoxide, and sorbitol are preferable, and ethylene glycol, propylene glycol, and glycerin are particularly more preferable, from the viewpoint of improving the electric conductivity. The electric conductivity improvers can be used one kind alone or in combination with two or more kinds.

The solid content concentration of the thus obtained conjugated conductive polymer-containing dispersion liquid is preferably from 0.5 to 20 mass %, more preferably from 1 to 10 mass %, further more preferably from 2 to 8 mass %, still further more preferably from 3 to 5 mass %.

In the step to obtain the conjugated conductive polymer-containing dispersion liquid, coordinating the polyanion on the surface of the seed particle can control the particle size of the conjugated conductive polymer and suppress the thickening during the polymerization. The conjugated conductive polymer can be coordinated to the polyanion as a dopant to produce the conductivity.

Step of Attaching Conjugated Conductive Polymer-Containing Dispersion Liquid to Surface of Porous Anode Body The method of the present invention include the step of attaching the conjugated conductive polymer-containing dispersion liquid obtained in the above-mentioned step to the surface of a porous anode body at least having an anode body made of a valve metal and a dielectric film formed on the surface of the anode body.

The solid electrolytic capacitor of the present invention can have a porous electrode formed by sintering valve metal powders with a high surface area or an electrode provided with a porous membrane obtained by etching valve metal foil.

Examples of the valve metal include Al, Be, Bi, Mg, Ge, Hf, Nb, Sb, Si, Sn, Ta, Ti, V, W, and Zr; and alloys and compounds of at least one of these metals and other elements. Particularly, electrode material made of a valve metal such as aluminum, niobium, or tantalum is preferable.

For example, the porous electrode made of a valve metal has a dielectric oxide film formed on the surface through anodic oxidation to be a porous anode body.

For example, the porous electrode is anodically oxidized by applying voltage in phosphoric acid solution to form a dielectric oxide film. The size of the formation voltage can be determined by the thickness of the dielectric oxide film and the withstand voltage of the capacitor. The preferable formation voltage is from 1 to 800 V, more preferably from 1 to 300 V.

Then, the conjugated conductive polymer-containing dispersion liquid is attached to the porous anode body. This attachment is conducted by a well-known method such as application, spray, or immersion. Particularly, immersion is preferable because the conjugated conductive polymer-containing dispersion liquid can be attached to and can permeate the porous anode body uniformly.

The immersion time is typically approximately from 10 seconds to 5 minutes. The temperature of the conjugated conductive polymer-containing dispersion liquid depends on the kind of the dispersion medium but is typically approximately from 10 to 35° C.

Step of Forming Solid Electrolyte Layer

The method of the present invention include the step of removing a part or all of the dispersion medium from the conjugated conductive polymer-containing dispersion liquid obtained in the above-mentioned step that is attached to the porous anode body, to form a solid electrolyte layer.

The dispersion medium is preferably removed by heat treatment in terms of efficiency, without the conjugated conductive polymer being deteriorated by oxygen. The heat conditions can be determined by the boiling point and the volatility of the dispersion medium.

As the heat conditions, the heat temperature is from room temperature to 300° C., preferably from 50 to 200° C., more preferably from 80 to 150° C. The heat treatment time is preferably from 5 seconds to several hours.

For the heat treatment, for example, a hot plate, an oven, and a hot air dryer can be used. The heat treatment can be conducted at atmospheric pressure or accelerated at reduced pressure.

The attachment of the dispersion liquid and the formation of the solid electrolyte layer may be repeated once or twice or more according to the kind of the electrode body.

Whenever the dispersion liquid is attached, the heat treatment may be conducted to remove a part or all of the dispersion medium. Alternatively, the dispersion liquid may be continuously attached several times, and then the dispersion medium may be removed at the end.

The dispersion medium contained in the attached dispersion liquid may be partially or fully removed, and then the porous anode body may be impregnated with any electrolyte solution.

EXAMPLES

The present invention is more specifically explained below with reference to the following examples but not limited thereto.

The physical properties of the dispersion liquid each obtained from the examples and the comparative examples were measured as described below.

(1) Solid Content Concentration

About 2 g of the dispersion liquid obtained each from the examples and the comparative examples was weighed in a sample container and then placed in a dryer of 105° C. for 1 hour. The mass of the sample in the sample container was measured. The mass after dried to the mass before dried (mass after dried/mass before dried) was calculated as the solid content concentration.

(2) Viscosity

The viscosity of the dispersion liquid during the polymerization was measured at 25° C. by using a Brookfield viscometer with a rotor of No. 2.

(3) pH

The pH of the dispersion liquid each obtained from the examples and the comparative examples was measured at 25° C. with a pH meter (model: HM-30G, available from DKK-TOA CORPORATION).

(4) Conductivity

While 100 g of the dispersion liquid each obtained from the examples and the comparative examples was stirred, aqueous ammonia was added to the dispersion liquid. Then, 10 g of ethylene glycol was added to obtain denatured dispersion liquid with a pH of 4.5. The pH-adjusted dispersion liquid was applied to a glass plate and hot-air dried at 100° C. to form a film with a thickness of 10 μm according to JIS K 7194. The conductivity of the film was measured with a Loresta (available from Mitsubishi Chemical Corporation).

(5) Particle Size of Seed Particle

The particle size of the seed particle was measured with a particle size distribution measurement device "microtrac UPA" available from NIKKISO Co., Ltd.

(6) Weight Average Molecular Weight of Sodium Polystyrenesulfonate

The weight average molecular weight was measured by gel permeation chromatography. For the measurement, "Shodex GPC 101" (Column OHPak SB-806M HQ) available from SHOWA DENKO K.K. was used. As the measurement conditions, the column temperature was 40° C., the eluent was water, and the elution rate was 1 ml/min. The weight average molecular weight (Mw) is based on standard polystyrene.

Example 1

Preparation of Seed Particle with Protective Colloid Formed from Polyanion

While being stirred in a nitrogen atmosphere, 1000 g of 22-mass % aqueous solution of sodium polystyrenesulfonate (trade name: Poly-NaSS PS-5, weight average molecular weight: about 120,000, available from TOSOH ORGANIC CHEMICAL CO., Ltd.) was heated to 80° C. 2 g of potassium persulfate was added to this solution. Subsequently, a monomer emulsion containing 135 g of styrene, 15 g of divinylbenzene, and 500 g of 22-mass % aqueous solution of sodium polystyrenesulfonate (described above) and 40 g of 2.5-mass % aqueous solution of potassium persulfate were added dropwise for 2 hours and 2.5 hours, respectively to the solution. After the dropwise addition ended, the solution was maintained at 80° C. for 2 hours and cooled down to room temperature. 1500 ml of cation exchange resin and 1500 ml of anion exchange resin were added to the obtained reaction liquid and stirred for 12 hours. Then, the ion exchange resins were filtered out to obtain a dispersion liquid containing the seed particle with protective colloid formed of a polyanion (polystyrene emulsion). The particle size D50 of the seed particle in the obtained polystyrene emulsion was 0.46 μm.

Preparation of conjugated conductive polymer-containing dispersion liquid Containing Seed Particle with Protective Colloid Formed from Polyanion 579.94 g of ion-exchanged water, 71.15 g of the above-mentioned polystyrene emulsion (non-volatile content: 28.0 mass %), and 36.05 g of 2-mass % aqueous solution of iron (III) p-toluenesulfonate hexahydrate were mixed at 27° C. While this solution was being irradiated with ultrasonic sound waves at 27° C. under a power consumption of 300 W/L with an ultrasonic disperser (product name: GSD1200AT, available from Ginsen), 8.57 g of 3,4-ethylenedioxythiophene was added and mixed in this solution.

While being stirred at 27° C. with a mixing blade under ultrasonic irradiation, 18.0 g of sodium peroxodisulfate was added in the obtained mixture to start polymerization. Subsequently, 47.8 g of the same polystyrene emulsion as that previously prepared was mixed with 237.9 g of ion-exchanged water and then additionally added dropwise in the above-mentioned mixture for 4 hours. Then, this mixture was reacted while being stirred at 27° C. with a mixing blade under ultrasonic irradiation for 4 hours.

After the reaction ended, 300 ml of cation exchange resin and 300 ml of anion exchange resin were added to the obtained reaction liquid and stirred for 12 hours to adsorb the unreacted monomer, the oxidant, and the oxidation catalyst to these ion exchange resins. The ion exchange resins were filtered out to obtain a conjugated conductive polymer-containing dispersion liquid (1-1) containing the seed particle with protective colloid formed from polystyrenesulfonate (polystyrene emulsion) and poly(3,4-ethylenedioxythiophene) doped with the polystyrenesulfonate.

The physical properties of the obtained dispersion liquid (1-1) were measured by the above-mentioned method. The obtained dispersion liquid (1-1) had a solid content concentration of 4.2 mass %, a pH of 1.9, and a conductivity of 93 S/cm. The viscosity at each time during the polymerization in preparation of the dispersion liquid (1-1) is shown in Table 3.

Preparation of Porous Anode Body with Dielectric Oxide Film on its Surface

A porous anode body with a dielectric oxide film on the surface, which is used for the solid electrolytic capacitor of the present invention, was prepared by the method disclosed in JP 2011-77257 A. Specifically, a porous anode body with a dielectric oxide film containing diniobium pentaoxide on the surface was prepared by using niobium powders for capacitors.

This porous anode body had a capacitance of 22 μF in 30% of sulfuric acid based on Non-patent Document "EIAJ standard RC2361A (revised in February, 2000)."

Attachment of Dispersion Liquid

The porous anode body obtained by the above-mentioned method was impregnated with the dispersion liquid (1-1) at 25° C. under atmospheric pressure for 1 minute and dried at 105° C. with a hot-air dryer. Subsequently, carbon paste was applied to the porous anode body without being brought into contact with the anode lead terminal and then dried. Then, silver paste was applied to the carbon layer of the porous anode body and dried to form the cathode contact.

The capacitance (μF) at 120 Hz and the equivalent series resistance (ESR) (Ω) at 100 kHz of the obtained solid electrolytic capacitor were measured with an LCR meter. The measurement result is shown in Table 4.

Examples 2 to 7

Preparation of Seed Particle with Protective Colloid Formed from Polyanion

Except for changing the composition of the seed particle with protective colloid as shown in Table 1, a dispersion liquid containing the seed particle with protective colloid formed of a polyanion (polystyrene emulsion) was obtained in the same way as Example 1. The particle size D50 of the seed particle in the obtained polystyrene emulsion was shown in Table 1.

Preparation of Conjugated Conductive Polymer-Containing Dispersion Liquid Containing Seed Particle with Protective Colloid Formed from Polyanion Except for changing the composition of the seed particle with protective colloid as shown in Table 1, the conjugated conductive polymer-containing dispersion liquids (1-2) to (1-8) containing the seed particle with protective colloid formed from polystyrenesulfonate (polystyrene emulsion) and poly(3,4-ethylenedioxythiophene) doped with the polystyrenesulfonate were obtained in the same way as Example 1.

The physical properties of the obtained dispersion liquids (1-2) to (1-8) were measured by the above-mentioned method. The measurement result is shown in Tables 2 and 3.

Preparation of Porous Anode Body with Dielectric Oxide Film on its Surface

A porous anode body was prepared in the same way as Example 1.

Attachment of Dispersion Liquid

Except for changing the dispersion liquid (1-1) to the dispersion liquids (1-2) to (1-8), a solid electrolytic capacitor was prepared, and the measurement was conducted, in the same way as Example 1. The measurement result is shown in Table 4.

Comparative Example 1

Preparation of Conjugated Conductive Polymer-Containing Dispersion Liquid not Containing Seed Particle with Protective Colloid Formed from Polyanion 593.24 g of ion-exchanged water, 58.44 g of 22-mass % aqueous solution of polystyrenesulfonate (trade name: Poly-NaSS PS-50, weight average molecular weight: about 230,000, available from TOSOH ORGANIC CHEMICAL CO., Ltd.), and 36.05 g of 2-mass % aqueous solution of iron (III) p-toluenesulfonate hexahydrate were mixed at 27° C. While this solution was being irradiated with ultrasonic sound waves at 27° C. under a power consumption of 300 W/L with an ultrasonic disperser (product name: GSD1200AT, available from Ginsen), 8.57 g of 3,4-ethylenedioxythiophene was added and mixed in this solution.

While being stirred at 27° C. with a mixing blade under ultrasonic irradiation, 18.0 g of sodium peroxodisulfate was added in the obtained mixture to start polymerization. Subsequently, 39.0 g of the same aqueous polystyrenesulfonate solution as that previously prepared was mixed with 246.8 g of ion-exchanged water and then additionally added dropwise in the above-mentioned mixture for 4 hours. Then, this mixture was reacted while being stirred at 27° C. with a mixing blade under ultrasonic irradiation for 4 hours.

After the reaction ended, 300 ml of cation exchange resin and 300 ml of anion exchange resin were added to the obtained reaction liquid and stirred for 12 hours to adsorb the unreacted monomer, the oxidant, and the oxidation catalyst to these ion exchange resins. The ion exchange resins were filtered out to obtain a dispersion liquid containing poly(3,4-ethylenedioxythiophene) doped with the polystyrenesulfonate.

The physical properties of the obtained dispersion liquid (2-1) were measured by the above-mentioned method. The obtained dispersion liquid (2-1) had a solid content concentration of 3.0 mass %, a pH of 1.9, and a conductivity of 102 S/cm. The viscosity at each time during the polymerization is shown in Table 1.

Preparation of Porous Anode Body with Dielectric Oxide Film on its Surface and Attachment of Dispersion Liquid A porous anode body with dielectric oxide film on the surface was prepared in the same way as Example 1.

Then, except for using the dispersion liquid (2-1) instead of the dispersion liquid (1-1), the dispersion liquid (2-1) was attached to the porous anode body to obtain a solid electrolytic capacitor in the same way as Example 1.

The capacitance (μF) at 120 Hz and the equivalent series resistance (ESR) (Ω) at 100 kHz of the obtained solid electrolytic capacitor were measured with an LCR meter. The measurement result is shown in Table 2.

Comparative Example 2

Preparation of Conjugated Conductive Polymer-Containing Dispersion Liquid not Containing Seed Particle with Protective Colloid Formed from Polyanion Except for changing the composition of the conjugated conductive polymer-containing dispersion liquid as shown in Table 2, a dispersion liquid containing poly(3,4-ethylenedioxythiophene) doped with the polystyrenesulfonate was obtained in the same way as Comparative Example 1. The particle size D50 of the seed particle in the obtained polystyrene emulsion was shown in Table 1.

Preparation of Conjugated Conductive Polymer-Containing Dispersion Liquid Containing Seed Particle with Protective Colloid Formed from Polyanion Except for changing the composition of the conjugated conductive polymer-containing dispersion liquid as shown in Table 2, the dispersion liquids (2-2) and (2-3) containing poly(3,4-ethylenedioxythiophene) doped with the polystyrenesulfonate were obtained in the same way as Example 1. The physical properties of the obtained dispersion liquids (2-2) and (2-3) were measured by the above-mentioned method. The measurement result is shown in Tables 2 and 3.

Preparation of Porous Anode Body with Dielectric Oxide Film on its Surface and Attachment of Dispersion Liquid A porous anode body with dielectric oxide film on the surface was prepared in the same way as Example 1. Then, except for using the dispersion liquids (2-2) and (2-3) instead of the dispersion liquid (1-1), the dispersion liquids (2-2) and (2-3) were each attached to the porous anode body to obtain solid electrolytic capacitors in the same way as Example 1.

The measurement result from the solid electrolytic capacitors is shown in Table 4.

TABLE 1

Seed particle with protective colloid formed of polyanion (Polystyrene emulsion)

| | | | Example 1 | Example 2 | Example 3 | Example 4 | Example 5 | Example 6 | Example 7 | Example 8 |
|---|---|---|---|---|---|---|---|---|---|---|
| Composition | Ethylenically unsaturated monomer | Styrene (g) | 135 | 135 | 135 | 150 | | | 67.5 | 135 |
| | | MMA (g)*1 | | | | | 150 | | | |
| | | t-BMA (g)*2 | | | | | | 150 | | |
| | Cross-linker | DVB (g)*3 | 15 | 15 | 15 | | | | 15 | 15 |
| | Polyanion | PS-5 (g)*4 | 330 | | 330 | 330 | 330 | 330 | 330 | 330 |
| | | PS-1 (g)*5 | | 330 | | | | | | |
| | Initiator | Potassium persulfate (g) | 12 | 12 | | 12 | 12 | 12 | 12 | 12 |
| | | APS (g)*6 | | | 12 | | | | | |
| | Monomer/Polyanion (parts by mass)*7 | | 40.9 | 40.9 | 40.9 | 45.5 | 45.5 | 45.5 | 20.5 | 40.9 |
| Physical properties | Particle size (μm) | | 0.46 | 0.15 | 0.46 | 0.6 | 0.38 | 0.72 | 0.5 | 0.46 |

*1MMA (methyl methacrylate)
*2t-BMA (tert-butyl methacrylate)
*3DVB (divinylbenzene)
*4PS-5 (sodium polystyrenesulfonate (weight average molecular weight: 120,000, available from TOSOH ORGANIC CHEMICAL CO., Ltd.))
*5PS-1 (sodium polystyrenesulfonate (weight average molecular weight: 50,000, available from TOSOH ORGANIC CHEMICAL CO., Ltd.))
*6APS (ammonium persulfate)
*7Content of ethylenically unsaturated monomer based on 100 parts by mass of polyanion

TABLE 2

Conductive polymer-containing dispersion liquid

| | | | Example 1 | Example 2 | Example 3 | Example 4 | Example 5 | Example 6 |
|---|---|---|---|---|---|---|---|---|
| Composition | Polystyrene emulsion | Polyanion | 22.34 | 22.34 | 22.34 | 22.34 | 22.34 | 22.34 |
| | | Seed particle | 3.83 | 3.83 | 3.83 | 3.83 | 3.83 | 3.83 |
| | | Water | 85.64 | 85.64 | 85.64 | 85.64 | 85.64 | 85.64 |
| | | Total amount | 118.95 | 118.95 | 118.95 | 118.95 | 118.95 | 118.95 |

TABLE 2-continued

| | | | | | | | | |
|---|---|---|---|---|---|---|---|---|
| | | Conductive polymer-containing dispersion liquid | | | | | | |
| | Monomer | EDOT (g)*8 | 8.57 | 8.57 | 7.71 | 8.57 | 8.57 | 8.57 |
| | | Pyrrole (g) | | | 0.86 | | | |
| | Oxidation catalyst | FePTs (g)*9 | 36.05 | 36.05 | 36.05 | 36.05 | 36.05 | 36.05 |
| | Oxidant | NaPS (g)*10 | 18.0 | 18.0 | | 18.0 | 18.0 | 18.0 |
| | | APS (g)*11 | | | 17.0 | | | |
| | Dispersion medium | Ion-exchanged water | 817.84 | 817.84 | 817.84 | 817.84 | 817.84 | 817.84 |
| | Anionic group/Monomer (mol)*12 | | 3.8 | 3.8 | 3.1 | 3.8 | 3.8 | 3.8 |
| | Polyanion/Conductive polymer (parts by mass)*13 | | 260.7 | 260.7 | 260.8 | 260.7 | 260.7 | 260.7 |
| | Dispersion medium (parts by mass)*14 | | 2702 | 2702 | 2703 | 2702 | 2702 | 2702 |
| Preparation condition | Dispersion time | Ultrasonic sound waves (hr) | 4 | 4 | 4 | 4 | 4 | 4 |
| | Additive amount of seed particle with protective colloid during polymerization (mass %)*15 | | 40.2 | 40.2 | 40.2 | 40.2 | 40.2 | 40.2 |
| Physical properties | Solid content concentration (%) | | 4.2 | 4.2 | 4.2 | 4.2 | 4.2 | 4.2 |
| | pH | | 1.9 | 1.9 | 1.9 | 1.9 | 1.9 | 1.9 |
| | Conductivity (S/cm) | | 93 | 95 | 93 | 94 | 90 | 90 |

| | | | Example 7 | Example 8 | Comparative Example 1 | Comparative Example 2 | Comparative Example 3 |
|---|---|---|---|---|---|---|---|
| Composition | Polystyrene emulsion | Polyanion | 25.89 | 22.34 | 21.44 | 21.44 | 21.44 |
| | | Seed particle | 0.28 | 3.83 | | | |
| | | Water | 85.64 | 85.64 | 76.00 | 76.00 | 76.00 |
| | | Total amount | 118.95 | 118.95 | 97.44 | 97.44 | 97.44 |
| | Monomer | EDOT (g)*8 | 8.57 | 8.57 | 8.57 | 7.71 | 8.57 |
| | | Pyrrole (g) | | | | 0.857 | |
| | Oxidation catalyst | FePTs (g)*9 | 36.05 | 36.05 | 36.06 | 36.06 | 36.06 |
| | Oxidant | NaPS (g)*10 | 18.0 | 18.0 | 18.0 | 18.0 | 18.0 |
| | | APS (g)*11 | | | | | |
| | Dispersion medium | Ion-exchanged water | 817.84 | 817.84 | 840.04 | 840.04 | 840.04 |
| | Anionic group/Monomer (mol)*12 | | 4.4 | 3.8 | 3.6 | 3.0 | 3.6 |
| | Polyanion/Conductive polymer (parts by mass)*13 | | 302.1 | 260.7 | 250.1 | 250.2 | 250.1 |
| | Dispersion medium (parts by mass)*14 | | 2702 | 2702 | 3171 | 3171 | 3171 |
| Preparation condition | Dispersion time | Ultrasonic sound waves (hr) | 4 | | 4 | 4 | |
| | Additive amount of seed particle with protective colloid during polymerization (mass %)*15 | | 40.2 | 40.2 | | | |
| Physical properties | Solid content concentration (%) | | 4.2 | 4.2 | 3 | 3 | 3 |
| | pH | | 1.9 | 1.9 | 1.9 | 1.9 | 1.9 |
| | Conductivity (S/cm) | | 92 | 83 | 102 | 92 | 86 |

*8EDOT(3,4-ethylenedioxythiophene)
*9FePT(2-mass % aqueous solution of iron (III) p-toluenesulfonate hexahydrate)
*10NaPS (sodium peroxodisulfate)
*11APS (ammonium persulfate)
*12Mole number of anionic group in polyanion based on 1 mol of monomer for obtaining conjugated conductive polymer
*13Content of polyanion based on 100 parts by mass of conjugated conductive polymer
*14Amount used of dispersion medium based on 100 parts by mass of total amount of conjugated conductive polymer and seed particle with protective colloid formed of polyanion
*15Content of seed particle with protective colloid formed of polyanion added during polymerization based on total amount

TABLE 3

| | | Reaction time (hour) | | | | | | |
|---|---|---|---|---|---|---|---|---|
| | | 0 | 1 | 2 | 3 | 4 | 5 | 6 |
| Viscosity during polymerization (mPa·s) | Example 1 | 5 | 50 | 1300 | 3500 | 1600 | 700 | 100 |
| | Example 2 | 5 | 60 | 1500 | 4500 | 2100 | 900 | 175 |
| | Example 3 | 5 | 50 | 1200 | 3200 | 1400 | 550 | 85 |
| | Example 4 | 5 | 60 | 1600 | 3200 | 1800 | 1000 | 130 |
| | Example 5 | 5 | 50 | 1100 | 3800 | 1900 | 900 | 90 |
| | Example 6 | 5 | 120 | 1900 | 2900 | 2200 | 1100 | 250 |
| | Example 7 | 5 | 60 | 1300 | 3500 | 1800 | 950 | 110 |
| | Example 8 | 5 | 210 | 2200 | 4300 | 2800 | 800 | 120 |
| | Comparative Example 1 | 5 | 600 | 5000 | 6000 | 3500 | 1300 | 500 |
| | Comparative Example 2 | 5 | 150 | 4500 | 5100 | 1950 | 480 | 160 |
| | Comparative Example 3 | 5 | 320 | 4300 | 7100 | 4200 | 1000 | 200 |

TABLE 4

|  | Example | | | | | | | | Comparative Example | | |
| --- | --- | --- | --- | --- | --- | --- | --- | --- | --- | --- | --- |
|  | 1 | 2 | 3 | 4 | 5 | 6 | 7 | 8 | 1 | 2 | 3 |
| Capacitance (Cs) (μF) at 120 Hz | 16.3 | 18.5 | 14.6 | 15.9 | 16.8 | 15.3 | 16.3 | 9.4 | 13.7 | 11.3 | 4.7 |
| Equivalent series (Ω) resistance (ESR) at 100 Hz | 0.13 | 0.11 | 0.14 | 0.12 | 0.12 | 0.13 | 0.14 | 0.28 | 0.15 | 0.21 | 1.10 |

Table 1 shows that the conjugated conductive polymer-containing dispersion containing the seed particle with protective colloid of Example 1 can be prepared without increasing the viscosity during the polymerization. Since the obtained dispersion liquid exhibited high impregnation properties in the porous anode body, Example 1 produced a solid electrolytic capacitor with more excellent capacitor characteristics, exhibiting higher capacitance and smaller equivalent series resistance than Comparative Example 1. Therefore, Example 1 shows that the present invention can productively manufacture a solid electrolytic capacitor with excellent capacitor characteristics.

On the other hand, Comparative Example 1 shows that the productivity is poor because the viscosity is extremely increased during the polymerization. Comparative Example 1 also shows that the capacitor characteristics of the solid electrolytic capacitor formed by using the dispersion liquid obtained from Comparative Example 1 are inferior to that of Example 1.

Since using PS-1 (weight average molecular weight 50,000) instead of the polyanion of Example 1 (PS-5, weight average molecular weight: 120,000), Example 2 had a higher viscosity during the polymerization than Example 1. However, Example 2 excellently controlled the viscosity and produced a solid electrolytic capacitor with more excellent capacitor characteristics, exhibiting a higher capacitance and a lower equivalent series resistance than Example 1.

Since using ammonium persulfate as the polymerization initiator instead of potassium persulfate of Example 1, Example 3 had a capacitance and an equivalent series resistance that were slightly poorer than Example 1. However, Example 3 had more excellent capacitor characteristics than the comparative examples.

As shown in Examples 4 to 6, styrene, methyl methacrylate, and tert-butyl methacrylate were used as the ethylenically unsaturated monomer composing the seed particle to provide a solid electrolytic capacitor with excellent capacitor characteristics.

Although using half as much styrene as Example 1, Example 7 had excellent capacitor characteristics as much as Example 1.

INDUSTRIAL APPLICABILITY

The method for manufacturing a solid electrolytic capacitor according to the present invention can productively manufacture an solid electrolytic capacitor with excellent capacitor characteristics by using a conjugated conductive polymer-containing dispersion liquid containing a seed particle with protective colloid with excellent conductivity and high impregnation properties in and high application properties to a porous anode body on which a dielectric oxide film is formed. Therefore, the present invention is industrially useful.

The invention claimed is:

1. A method for manufacturing a solid electrolytic capacitor, comprising the steps of:
   in a dispersion medium comprising a monomer for obtaining a conjugated conductive polymer and a seed particle with protective colloid formed of a polyanion coordinated on a surface of the seed particle, polymerizing the monomer to obtain a conjugated conductive polymer-containing dispersion liquid;
   attaching the conjugated conductive polymer-containing dispersion liquid to the surface of a porous anode body at least having an anode body made of a valve metal and a dielectric film formed on the surface of the anode body; and
   removing a part or all of the dispersion medium from the conjugated conductive polymer-containing dispersion liquid attached to the porous anode body to form a solid electrolyte layer.

2. The method according to claim 1, wherein the seed particle is a homopolymer or a copolymer obtained by polymerizing an ethylenically unsaturated monomer.

3. The method according to claim 1, wherein the particle size D50 of the seed particle with protective colloid formed of a polyanion is from 0.01 to 10 μm.

4. The method according to claim 1, wherein in the step to obtain the conjugated conductive polymer-containing dispersion liquid, an additional dispersion liquid containing a seed particle with protective colloid formed of a polyanion is added during the polymerization of the monomer.

5. The method according to claim 1, wherein in the step to obtain the conjugated conductive polymer-containing dispersion liquid, the generated conjugated conductive polymer is subjected to dispersion treatment during the polymerization of the monomer.

6. The method according to claim 5, wherein the dispersion treatment is conducted under ultrasonic irradiation.

7. The method according to claim 1, wherein the monomer for obtaining a conjugated conductive polymer is at least one selected from a group consisting of a pyrrole containing or not containing a substituent, an aniline containing or not containing a substituent, and a thiophene containing or not containing a substituent.

8. The method according to claim 1, wherein the monomer for obtaining a conjugated conductive polymer comprises a compound expressed by the following formula (I):

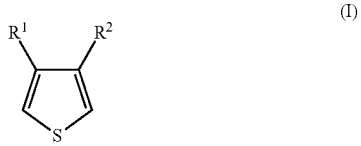

wherein $R^1$ and $R^2$ each independently represent a hydrogen atom, a hydroxyl group, an alkyl group with 1 to 18 carbon atoms containing or not containing a substituent, an alkoxy group with 1 to 18 carbon atoms containing or not containing a substituent, or an alkylthio group with 1 to 18 carbon atoms containing or not containing a substituent, or may bind to each other to form a ring such as an alicycle with 3 to 10 carbon atoms containing or not containing a substituent, an aromatic ring with 6 to 10 carbon atoms containing or not containing a substituent, an oxygen atom-containing hetero ring with 2 to 10 carbon atoms containing or not containing a substituent, a sulfur atom-containing hetero ring with 2 to 10 carbon atoms containing or not containing a substituent, or an oxygen and sulfur atom-containing hetero ring with 2 to 10 carbon atoms containing or not containing a substituent.

9. The method according to claim 1, wherein the polyanion is a polymer with a sulfonate group.

10. The method according to claim 1, wherein the anion group of the polyanion is from 0.25 to 30 mol based on 1 mol of the monomer for obtaining a conjugated conductive polymer.

11. The method according to claim 1, wherein the step to obtain the conjugated conductive polymer-containing dispersion liquid,
the dispersion medium comprises water, and
the polymerization is conducted by using at least one oxidant selected from a group consisting of a peroxodisulfuric acid and salts thereof.

12. The method according to claim 1, wherein the conjugated conductive polymer-containing dispersion liquid comprises at least one electric conductivity improver selected from a group consisting of ethylene glycol, propylene glycol, and glycerin.

* * * * *